(12) United States Patent
Fritz-Vietta

(10) Patent No.: US 12,297,020 B2
(45) Date of Patent: May 13, 2025

(54) METHOD FOR PRODUCING PACKAGING FOR AN ITEM AND PACKAGING

(71) Applicant: Leef Blattwerk GmbH, Potsdam (DE)

(72) Inventor: Claudio Pascal Fritz-Vietta, Potsdam (DE)

(73) Assignee: Leef Blattwerk GmbH, Potsdam (DE)

( * ) Notice: Subject to any disclaimer, the term of this patent is extended or adjusted under 35 U.S.C. 154(b) by 0 days.

(21) Appl. No.: 17/545,142

(22) Filed: Dec. 8, 2021

(65) Prior Publication Data
US 2022/0185559 A1    Jun. 16, 2022

(30) Foreign Application Priority Data
Dec. 10, 2020    (EP) ..................... 20213206

(51) Int. Cl.
| | |
|---|---|
| B65D 65/46 | (2006.01) |
| B29C 43/00 | (2006.01) |
| B29C 43/02 | (2006.01) |
| B29C 59/02 | (2006.01) |
| B29C 65/00 | (2006.01) |
| B65D 1/34 | (2006.01) |
| B65D 77/20 | (2006.01) |
| B29L 31/00 | (2006.01) |

(52) U.S. Cl.
CPC .......... *B65D 65/466* (2013.01); *B29C 43/003* (2013.01); *B29C 43/021* (2013.01); *B29C 59/02* (2013.01); *B29C 66/53461* (2013.01); *B65D 1/34* (2013.01); *B65D 77/2024* (2013.01); *B29C 2059/027* (2013.01); *B29L 2031/7132* (2013.01); *B65D 2565/381* (2013.01)

(58) Field of Classification Search
None
See application file for complete search history.

(56) References Cited

U.S. PATENT DOCUMENTS 10,004,345 B1    6/2018    Vukkisila

FOREIGN PATENT DOCUMENTS

| DE | 3927062 A1 * | 2/1991 |
|---|---|---|
| DE | 39 27 062 C2 | 1/1994 |
| DE | 20 2015 105 015 U1 | 1/2016 |

(Continued)

OTHER PUBLICATIONS

Machine translation of Banerjee (DE 3927062) (Year: 1991).*
Machine Translation of Jean-Yves (FR 3024844) (Year: 2016).*
Annotated version of Banerjee machine translation. (Year: 1991).*

*Primary Examiner* — Robert J Grun
(74) *Attorney, Agent, or Firm* — Schmeiser, Olsen & Watts LLP

(57) ABSTRACT

A method for producing packaging for an item and to a packaging for an item is provided. The method provides for the following: providing a container material consisting of a leaf material from a plant; shaping the container material into a three-dimensional packaging container having a container opening and a container edge surrounding the container opening; producing a sealing edge on a top surface of the container edge, wherein the top surface of the container edge is sanded down by sanding; placing an item in the three-dimensional packaging container through the container opening and sealing the container opening by a sealing film, wherein the sealing film is adhesively bonded to the sealing edge in an adhesive-free manner.

13 Claims, 2 Drawing Sheets

(56) References Cited

FOREIGN PATENT DOCUMENTS

Figure 1:
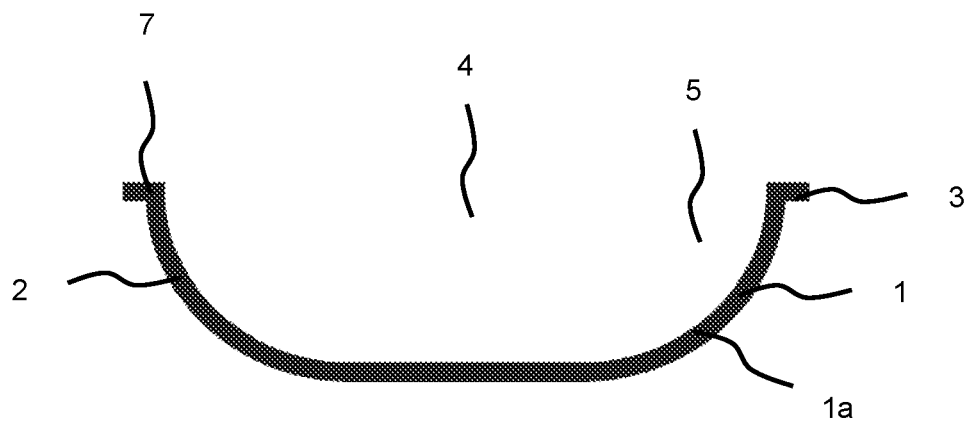

| | | |
|---|---|---|
| DE | 20 2017 006 954 U1 | 2/2019 |
| EP | 1 438 914 A1 | 7/2004 |
| FR | 3024844 A1 * | 2/2016 ............. B29C 51/16 |

* cited by examiner

METHOD FOR PRODUCING PACKAGING FOR AN ITEM AND PACKAGING

CROSS-REFERENCE TO RELATED APPLICATIONS

This application claims priority to European Application No. 20213206.4, having a filing date of Dec. 10, 2020, the entire contents of which are hereby incorporated by reference.

FIELD OF TECHNOLOGY

The following relates to a method for producing packaging for an item and to packaging for an item.

BACKGROUND

Packaging is used, for example, to package all kinds of items for sale and distribution. This includes items in solid or liquid form, for example as beverages in beverage cups.

It has been proposed to produce packaging or packaging containers from a plant-based container material. Palm leaves, for example, are used as a plant-based container material. This is described in DE 20 2017 006 954 U1 and U.S. Pat. No. 10,004,345 B1, for example. Furthermore, it has been proposed to produce disposable dishes or trays from palm leaves (cf. EP 1 438 914 A1, DE 20 2015 105 015 U1).

Packaging consisting of a palm leaf material is also disclosed in DE 39 27 062 C2. In one embodiment, a packaging tray is produced in which a container opening is then sealed by a plastics film in order to package the item. In this case, the plastics film is placed around a circumferential container edge in such a way that the film is arranged on both the upper and lower side of the container edge. The plastics film placed around the container edge is intended to adhere by adhesion. The packaging container can be printed on in order to give it a design. In this context, it is proposed to sand the blank material for the container down before pressing or cutting it to size and to print it in the desired manner, for example with an inscription. For optical reasons, the lower outer side of the container can also be sanded smooth, so that the container can also be labeled on this side by printing. In addition, the entire outer side of the container may be provided with a protective layer before or after the inscription is applied.

SUMMARY

An aspect relates to a method for producing packaging for an item and to provide a packaging for an item, by which sustainable packaging can be provided for any item in a simple and efficient manner.

One aspect relates to a method for producing packaging for an item, in which the following is provided: providing a container material consisting of a leaf material from a plant; shaping the container material into a three-dimensional packaging container having a container opening and a container edge surrounding the container opening; producing a sealing edge on a top surface of the container edge, wherein the top surface of the container edge is sanded down by sanding; placing an item in the three-dimensional packaging container through the container opening and sealing the container opening by a sealing film, wherein the sealing film is adhesively bonded to the sealing edge in an adhesive-free manner.

A further aspect relates to a packaging for an item, which comprises the following: a three-dimensional packaging container consisting of a leaf material from a plant; a container opening; a container edge which is formed on the three-dimensional packaging container so as to surround the container opening; a sealing edge which is formed on a top surface of the container edge as a sanded surface; an item placed in the three-dimensional packaging container through the container opening; and a seal which is formed by a sealing film which is adhesively bonded to the sealing edge in an adhesive-free manner.

The sealing bond between the sealing film and the container edge is produced exclusively in the region of the sealing edge which was previously produced by sanding in the region of the top surface of the container edge. At least the lower side of the container edge is free of the sealing film in order to save material, and so the film does not have to be folded down from the top surface around the outer edge of the container edge.

The phrase "adhesive-free" in the sense of the present application means that no adhesives are used in addition to the sealing film during sealing. In one possible embodiment, the sealing film itself can have a lacquer coating (sealing lacquer) on the surface, which coating at least partially melts during sealing, and this forms the adhesion of the sealing film to the sealing edge alone or assists with this.

With the aid of the proposed technology, it is possible to reliably seal the three-dimensional packaging container made from a plant material as tightly as possible after the item to be packaged has been introduced by forming a closed sealing bond between the sealing edge on the top surface of the container edge and the sealing film. The container edge is sanded down to produce the sealing closure, and this results in the sealing edge, in the region of which the adhesive (but adhesive-free) bond with the sealing film is then established. In order to form the sealing edge, sanding can be used to remove e.g., residues in the region of the top surface of the container edge which may accumulate here during the previously performed shaping of the container material and which can hinder the formation of the adhesive bond with the sealing film. The surface contour in the region of the top surface of the container edge can also be specifically influenced by sanding to produce the sealing edge. This then makes it possible, without additional adhesive, to form a well-adhering bond between the sealing film and the three-dimensional packaging container in the region of the sealing edge.

A plastics film can be used as the sealing film. The sealing film can be designed as a biodegradable film, in particular made of a biodegradable plastic. The sealing film can be designed as a single-layer or multi-layer material. The sealing film can consist of an oil-based plastic, for example PET (polyethylene terephthalate) or the like. Other plastics can also be used, for example based on a PLA plastic (PLA—polylactide) or a PAH plastic (PAH—polycyclic aromatic hydrocarbons).

The sealing film can be a compostable plastics film. Alternatively, a non-compostable plastics film can be used.

When sealing the container opening, the following can also be provided: supporting the container edge having the sealing edge on a support tool and pressing the sealing film by a pressing tool against the sealing edge on the container edge, the sealing film being heated in the process in such a way that the sealing film partially melts for adhesive bonding to the sealing edge on the container edge. The support tool can be formed with a sealing frame. In addition to the support of the container edge, the three-dimensional packaging container can also be supported by the support tool at least in portions in a central container region surrounded by the container edge, by arranging the three-dimensional packaging container in a negative mold provided by the support tool. Alternatively, the three-dimensional packaging container can simply be arranged so as to be exposed in an opening of the support tool in the container region surrounded by the container edge. In this way, the support tool can be designed in a simple manner.

A palm leaf can be used as the leaf material, optionally a cut of the palm leaf.

The leaf material can be moistened, heated and compression-molded during shaping. After compression-molding, edge portions can be cut off to form the container.

The container edge can be smoothed during sanding to produce the sealing edge, with surface-side leaf structures of the leaf material being sanded down. The smoothing during the production of the sealing edge further supports effective adhesion of the sealing film to the sealing edge when the container opening is sealed. A continuously smooth surface can be produced along the edge of the seal.

The sealing edge can be produced by a uniform sanding process in which the container edge is laid flat in its entirety on an optionally flat sanding surface which grips the container edge surrounding the container opening in its entirety. In this way, the sealing edge is produced in one go in the region of the top surface of the container edge. All regions of the sealing edge are sanded down at the same time.

When shaping the container material, a container from the following group can be produced as the three-dimensional packaging container: tray, plate, mug, and bowl.

The container opening can be sealed in a liquid-tight manner by the sealing film. This makes it possible to use the packaging for liquid (sales) items, for example as a drinking cup. Ready-made meals or other liquid or solid products can also be packaged in this way, for example liquid soap.

In order to make the leaf material more resistant to liquids, the inside of the container can also be coated, irrespective of the sealing.

The leaf material can have a barrier layer on an upper side which faces the packaged item and/or an opposite lower side, which layer can be formed with a thin-film coating in order to reduce the fluid permeability of the leaf material and thus to increase the barrier function of the leaf material. The thin-film coating can e.g., consist of one or more compostable bioplastics, for example PLA and/or PHA plastic.

The embodiments explained above in connection with the method for producing the packaging for an item can be provided accordingly in connection with the packaging.

The packaging can be provided as recyclable or compostable packaging.

BRIEF DESCRIPTION

Figure 2:
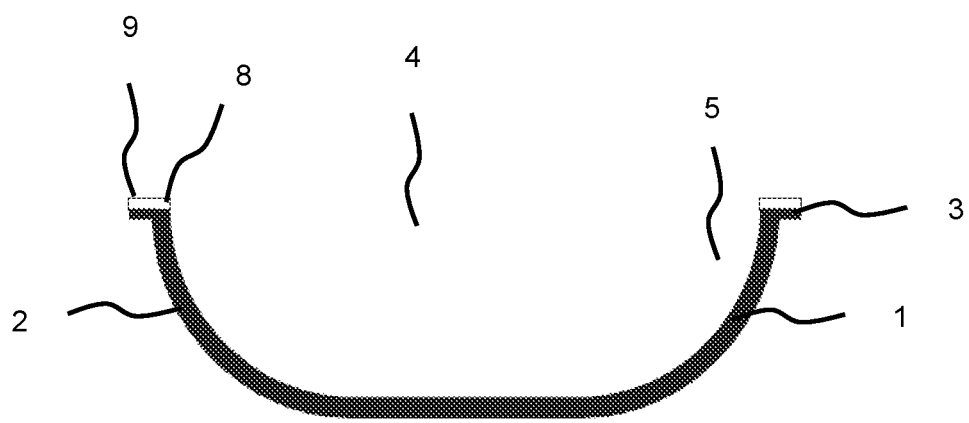
Figure 3:
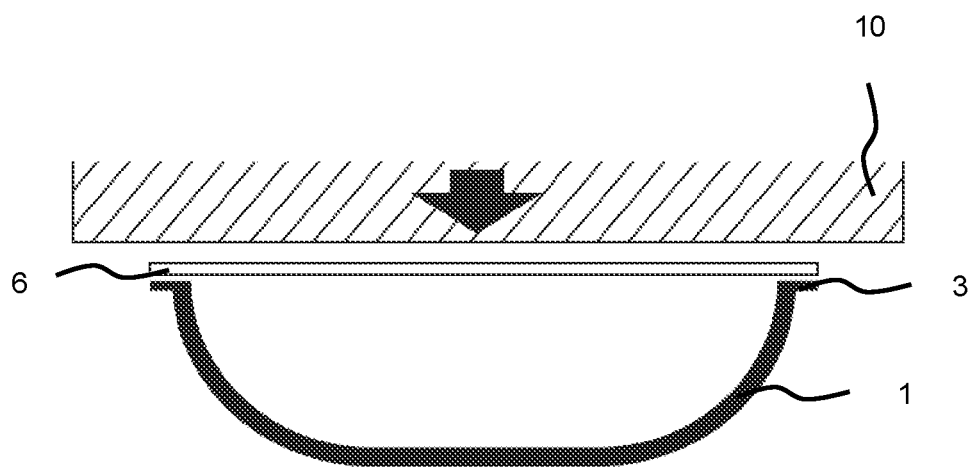
Figure 4:
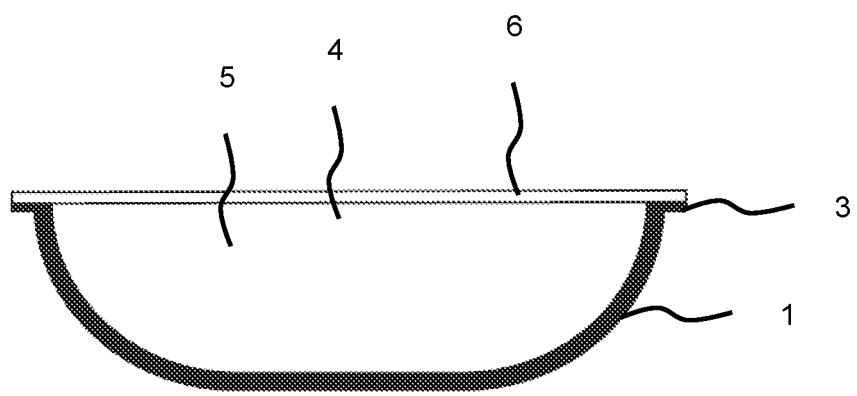

Some of the embodiments will be described in detail, with references to the following Figures, wherein like designations denote like members, wherein:

FIG. 1 schematically shows a blank for a three-dimensional packaging container in section;

FIG. 2 schematically shows the three-dimensional packaging container with a sanded sealing edge in section;

FIG. 3 schematically shows the three-dimensional packaging container when sealing with a sealing film in section; and FIG. 4 schematically shows the three-dimensional packaging container after sealing with the sealing film in section.

DETAILED DESCRIPTION

FIGS. 1 to 4 schematically show a three-dimensional packaging container 1 in section, in which a container wall 2 consists of a palm leaf material.

FIG. 1 schematically shows a blank 1*a* for the three-dimensional packaging container 1 in section. The blank 1*a* is produced from a palm leaf material by molding in a molding tool (not shown) using pressure and temperature starting from a container material (palm leaf).

In the three-dimensional packaging container 1, a container edge 3 surrounds a container opening 4 through which an item to be packaged (not shown) can be introduced into a receiving space 5 of the three-dimensional packaging container 1. This can be a solid item or a liquid item, for example fruit or any other food, soup, or drink. However, other products in liquid or solid form can also be produced in this way as packaged items, for example solid or liquid soap, stationery or the like.

The use of a sealing film 6 is provided for sealing the receiving space 5 of the three-dimensional packaging container 1 (cf. FIGS. 3 and 4). In preparation for sealing, the circumferential container edge 3 is sanded smooth in the region of a circumferential top surface 7 in a sanding process to produce a schematically shown sealing edge 8 with a smoothed surface 9. During the sanding process, unevenness that occurs due to the nature of the palm leaf is at least partially sanded down by material removal.

The container opening 4 is then sealed by the sealing film 6. In this process, the container edge 2 is supported on a support tool (not shown) which supports at least the container edge 3, and optionally the entire shape of the packaging container 1.

The sealing film 6 is pressed against the sealing edge 8 with the aid of a pressing tool 10 and with the application of temperature, and is partially melted or fused on, in particular a surface coating on the sealing film 6 (for example a sealing lacquer), so that an adhesive bond (sealing bond) is established between the sealing film 6 and the sealing edge 8 on the container edge 3 without the use of adhesives (without additional adhesives), and at least partially or completely covers the smoothed surface 9. In this way, any item can be packaged efficiently and safely.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for producing packaging for an item, comprising:
   providing a container material comprised of a leaf material from a plant;
   shaping the container material into a three-dimensional packaging container comprising a container opening and a container edge surrounding the container opening;
   producing a sealing edge on a top surface of the container edge, wherein the top surface of the container edge is sanded down by sanding;

placing an item in the three-dimensional packaging container through the container opening; and sealing the container opening exclusively in a region of the sealing edge by a sealing film such that the sealing film is not folded down from the top surface to cover an outer edge of the container below the container edge and avoids touching an inner surface of the packaging container, wherein the sealing film is adhesively bonded to the sealing edge in an adhesive-free manner;

wherein the sealing edge is produced by sanding after the shaping of the container material;

wherein, after the shaping the container material, only the top surface of the container edge is sanded.

2. The method according to claim 1, wherein a plastics film is used as the sealing film.

3. The method according to claim 1, wherein a compostable plastics film is used as the sealing film.

4. The method according to claim 1, wherein when sealing the container opening, the following is also provided:

supporting the container edge comprising the sealing edge on a support tool; and pressing the sealing film by a pressing tool against the sealing edge on the container edge, the sealing film being heated in the process in such a way that the sealing film partially melts for adhesive bonding to the sealing edge on the container edge.

5. The method according to claim 1, wherein a palm leaf is used as the leaf material.

6. The method according to claim 1, wherein a leaf material comprising a barrier layer is used as the leaf material.

7. The method according to claim 1, wherein the leaf material is moistened, heated and compression-molded during shaping.

8. The method according to claim 1, wherein the container edge is smoothed during sanding to produce the sealing edge, with surface-side leaf structures of the leaf material being sanded down.

9. The method according to claim 1, wherein the sealing edge is produced by a uniform sanding process in which the container edge is laid flat in its entirety on a sanding surface which grips the container edge surrounding the container opening in its entirety.

10. The method according to claim 1, wherein when the container material is shaped as the three-dimensional packaging container, a container from the following group is produced: tray, plate, mug, and bowl.

11. The method according to claim 1, wherein the container opening is sealed in a liquid-tight manner by the sealing film.

12. Packaging for an item, comprising:

a three-dimensional packaging container comprised of a leaf material from a plant;

a container opening;

a container edge which is formed on the three-dimensional packaging container so as to surround the container opening;

a sealing edge which is formed on a top surface of the container edge as a sanded surface;

an item placed in the three-dimensional packaging container through the container opening; and a seal formed by a sealing film exclusively in a region of the sealing edge such that the sealing film is not folded down from the top surface to cover an outer edge of the container below the container edge and avoids touching an inner surface of the packaging container, wherein the sealing film is adhesively bonded to the sealing edge in an adhesive-free manner;

wherein the sealing edge is produced by sanding after the shaping of the container material;

wherein, after the shaping of the container material, only the top surface of the container edge is sanded.

13. The packaging according to claim 12, configured as recyclable packaging.

* * * * *